(12) United States Patent
Isomäki

(10) Patent No.: US 6,938,090 B2
(45) Date of Patent: Aug. 30, 2005

(54) AUTHENTICATION AND PROTECTION FOR IP APPLICATION PROTOCOLS BASED ON 3GPP IMS PROCEDURES

(75) Inventor: Markus Isomäki, Espoo (FI)

(73) Assignee: Nokia Corporation, Espoo (FI)

( * ) Notice: Subject to any disclaimer, the term of this patent is extended or adjusted under 35 U.S.C. 154(b) by 252 days.

(21) Appl. No.: 10/132,226

(22) Filed: Apr. 26, 2002

(65) Prior Publication Data

US 2003/0204608 A1 Oct. 30, 2003

(51) Int. Cl.[7] .................... G06F 15/16; G06F 15/173; H04L 9/00

(52) U.S. Cl. ................. 709/229; 709/225; 713/171; 713/201

(58) Field of Search ................. 455/67.1, 410; 713/201, 151, 155, 159, 168, 171, 185; 380/270; 709/201, 217, 219, 229, 225

(56) References Cited

U.S. PATENT DOCUMENTS

| | | | |
|---|---|---|---|
| 2003/0040280 A1 * | 2/2003 | Koskelainen | 455/67.1 |
| 2003/0100291 A1 * | 5/2003 | Krishnarajah et al. | 455/410 |
| 2003/0152232 A1 * | 8/2003 | Pirila et al. | 380/270 |
| 2003/0159067 A1 * | 8/2003 | Stirbu | 713/201 |

* cited by examiner

Primary Examiner—Paul Kang
(74) Attorney, Agent, or Firm—Antonelli, Terry, Stout & Kraus, LLP

(57) ABSTRACT

The present invention is a system and method which provides authentication for data services for at least one UE (12) using common authentication information based upon information stored in a HSS (16) of a home network (20) of the at least one UE for multiple protocols. At least one proxy server (18) stores authentication information for each of the protocols which may be used to provide data services to the at least one UE. Authentication of the protocols available to the at least one UE uses the authentication information stored at the at least one proxy server obtained from the protocol used in the home network of the at least one UE.

48 Claims, 1 Drawing Sheet

AUTHENTICATION AND PROTECTION FOR IP APPLICATION PROTOCOLS BASED ON 3GPP IMS PROCEDURES

BACKGROUND OF THE INVENTION

1. Field of the Invention

The present invention relates to systems and methods for authenticating requests for data services from at least one user equipment using multiple protocols.

2. Description of the Prior Art

The 3GPP Technical Specification TS 33.203 v1.0.0 (2001–12), which is incorporated herein by reference in its entirety, authenticates IP multimedia core network subsystem (IMS) customers by running the Authentication and Key Agreement (AKA) protocol during a SIP register transaction. See Section 6.1 for a discussion of the AKA. After authentication using AKA is completed, the created integrity key (IK) and Cipher Key (CK) are shared between the User Equipment (UE) and the Proxy Call State Control Function (PCSCF) which is the first entity in a SIP network receiving a request for a session from UE. The P-CSCF may be resident in either a home network or a visited network. SIP requests for services are protected by the IK and CK keys until the keys are renewed by another register transaction. The IK and CK keys are securely distributed by any well known technique, such as IP Sec or EPS.

The main SIP entities used for registration of the UE are: UE, P-CSCF, the serving call state control function (S-CSCF) and a home subscriber server (HSS). The UE communicates with the P-CSCF, which communicates with the S-CSCF which communicated with the HSS. A detailed description of authentication and registration is found in Sections 4 and 5–5.2 of the aforementioned specification.

With the advent of IP multimedia services (IM), it is desirable for UE using SIP to have access to data services using additional protocols, such as the Hyper Text Transport Protocol (HTTP) and the Real-Time Streaming Protocol (HTSP) protocol. A description of the RTSP is found in RFC 2326 dated 1998 which is incorporated herein by reference in its entirety.

Basic to the access of UE to network services involving any protocol, such as SIP, HTTP, and RTSP, is the need for authentication of the UE and security. The state of the art presently is that each protocol utilizes its own security and authentication measures when a request by UE is made for a session of data services. When a UE is a requester of data services involving multiple protocols, individual protocol specific network entities are necessary in the form of a proxy server or otherwise to perform authentication for each protocol. The multiple entities required currently for authentication of UE to obtain sessions involving multiple protocols, which may have different network addresses, involve a duplication of processing by each proxy to obtain the authentication information.

SUMMARY OF THE INVENTION

The present invention is a system, method, and at least one proxy server which provides authentication for UE sessions of data services requiring multiple protocols which use common authentication information for each of the multiple protocols. At least one proxy server is used to authenticate requests for sessions of data services from UE for the multiple protocols. While the simplest architecture which may be used to practice the invention is a single proxy server, it should be understood that more than one proxy server may be used to perform authentication for data services for UE for the multiple protocols using the common authentication information.

The at least one proxy server stores authentication information from a subscriber data server of a home network for at least one UE required for a first protocol. The at least one proxy server authenticates requests for sessions of data services received from at least one UE for protocols other than the first protocol by using the authentication information obtained from the subscriber data server for the first protocol.

In a preferred embodiment, the first protocol is SIP and the at least one additional protocol is one or both of HTTP and RTSP. Requests for sessions of data services using SIP are transmitted from the P-CSCF resident in the at least one proxy server to a S-CSCF server of the home network and then to the HSS. Requests for sessions of data services using the HTTP protocol use the SIP authentication information and are transmitted from a Hyper Text Transport Protocol (HTTP) proxy of the at least one proxy server to a HTTP server. Requests for sessions of data services using the RTSP protocol use the SIP authentication information and are transmitted from a Real-Time Streaming Protocol (RTSP) proxy of the proxy server to a RTSP server.

The preferred authentication information transmitted from the HSS to the at least one proxy server comprises an integrity key (IK) and a cipher key (CK). The authentication information transmission from the at least one UE to the at least one proxy server also comprises the integrity key (IK) and the cipher key (CK). The keys are processed by the at least one proxy server to determine if the at least one UE is authentic.

The invention eliminates the need for unique authentication information for each protocol to authenticate data sessions for UE. In a preferred embodiment a single proxy server includes all of the proxies for the protocols resident therein. The authentication information for the additional protocols, e.g. HTTP and RTSP, is obtained from SIP authentication information of the at least one UE.

The invention is a system including a home network including a subscriber data server which stores at least one user profile regarding providing of data services to at least one user with the profile including authentication information used to authenticate the at least one user of the data services when a request for data services is made using a first protocol; at least one user equipment which requests data services using the first protocol and data services using at least one additional protocol, the at least one user equipment storing authentication information which is used when a request for data services is made to authenticate the at least one user; at least one proxy server including resident therein a first proxy for the first network protocol and at least one additional proxy for the at least one additional protocol; and wherein the first proxy and the at least one additional proxy of the one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server. The subscriber data server may be a home subscriber server (HSS); and the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network. The subscriber data server may be a home subscriber server (HSS); the first protocol may be the Session Initiation Protocol (SIP) and a request for data data services using SIP is transmitted from a Proxy Call State Control Function (P-CSCF) of the at least one proxy server to a Serving Call State Control Function (S-CSCF) server of the home network; and the at least one additional protocol may be the Hyper Text Transport Protocol (HTTP) and a request for data services using HTTP may be transmitted from a Hyper Text Transport Protocol (HTTP) proxy of the at least one proxy server to a HTTP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server; and the at least one additional protocol may be the Real-Time Streaming Protocol (RTSP) and a request for data services may be transmitted from a Real-Time Streaming Protocol (RSTP) proxy of the at least one proxy server to a RTSP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network; and the at least one additional protocol may be the Hyper Text Transport Protocol (HTTP) and the Real-Time Streaming Protocol (RTSP) and a request for data services using HTTP may be transmitted from a Hyper Text Transport Protocol (HTTP) proxy of the at least one proxy server to a HTTP server and a request for data services using RTSP may be transmitted from a Real-Time Streaming Protocol (RTSP) proxy of the at least one proxy server to a RTSP server. The authentication information transmitted from the subscriber data server to the at least one proxy server may comprise an integrity key IK and a cipher key CK and the authentication information transmitted from the at least one user equipment to the at least one proxy sever may comprise an integrity key IK and a cipher key CK which keys are processed by the at least one proxy server to determine if the at least one user is authentic. The authentication information transmitted from the subscriber data server and the at least one user equipment may be generated using the Authentication and Key Agreement (AKA) protocol.

In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user; at least one proxy server including resident therein a first proxy for the first network protocol and at least one additional proxy for the at least one additional protocol, a method of authentication of the at least one user equipment includes the first proxy and the at least one additional proxy of the at least one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server. The subscriber data server may be a home subscriber server (HSS); the first protocol may be the Session Initiation Protocol (SIP) and a request for data data services using SIP may be transmitted from a Proxy Call State Control Function (P-CSCF) of the at least one proxy server to a Serving Call State Control Function (S-CSCF) server of the home network; and the at least one additional network protocol may be the Hyper Text Transport Protocol (HTTP) and a request for data services using HTTP may be transmitted from a Hyper Text Transport Protocol (HTTP) proxy of the at least one proxy server to a HTTP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server; and the at least one additional protocol may be the Real-Time Streaming Protocol (RTSP) and a request for data services may be transmitted from a Real-Time Streaming Protocol (RTSP) proxy of the at least one proxy server to a RTSP server. The subscriber data server may be a home subscriber server (HSS); the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network; and the at least one additional protocol may be the Hyper Text Transport Protocol (HTTP) and the Real-Time Streaming Protocol (RTSP) and a request for data services using HTTP may be transmitted from a Hyper Text Transport Protocol (HTTP) proxy of the at least one proxy server to a HTTP server and a request for data services using RTSP may be transmitted from a Real-Time Streaming Protocol (RTSP proxy of the at least one proxy server to a RTSP server. The authentication information transmitted from the subscriber data server to the at least one proxy server may comprise an integrity key IK and a cipher key CK and the authentication information transmitted from the at least one user equipment to the at least one proxy sever may comprise an integrity key IK and a cipher key CK which keys may be processed by the at least one proxy server to determine if the at least one user is authentic. The authentication information transmitted from the subscriber data server and the at least one user equipment may be generated using the Authentication and Key Agreement (AKA) protocol.

In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server in accordance with the invention includes a first proxy for the first network protocol and at least one additional proxy for the at least one additional protocol which are resident in the at least one proxy server; and wherein the first proxy and the at least one additional proxy of the at least one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server. The subscriber data server may be a home subscriber server (HSS); and the first protocol may be the Session Initiation Protocol (SIP) and any request for data services using SIP may be transmitted from a Proxy Call State Control Function (P-CSCF) of the at least one proxy server to a Serving Call State Control Function (S-CSCF) server of the home network. The subscriber data server may be a home subscriber server (HSS); and the first protocol may be the Session Initiation Protocol (SIP) and a request for data data services using SIP may be transmitted from a Proxy Call State Control Function (P-CSCF) of the at least one proxy server to a Serving Call State Control Function (S-CSCF) server of the home network; and the at least one additional network protocol may be the Hyper Text Transport Protocol (HTTP) and a request for data services using HTTP may be transmitted from a Hyper Text Transport Protocol (HTTP) proxy of the at least one proxy server to a HTTP server. The subscriber data server may be a home subscriber server (HSS); and the first protocol may be the Session Initiation Protocol (SIP) and a request for data services using SIP may be transmitted from the at least one proxy server to a Serving Call State Control Function (S-CSCF) server, and the at least one additional protocol may be the Real-Time Streaming Protocol (RTSP) and a request for data services may be transmitted from a Real-Time Streaming Protocol (RSTP) proxy of the at least one proxy server to a RTSP server. The subscriber data server may be a home subscriber server (HSS); and the first protocol may be the Session Initiation Protocol (SIP) and a request for data services using SIP may be transmitted from a Proxy Call State Control Function (P-CSCF) of the at least one proxy server to a Serving Call State Control Function (S-CSCF) server of the home network, and the at least one additional protocol may be the Hyper Text Transport Protocol (HTTP) and the Real-Time Streaming Protocol (RTSP) and a request for data services using HTTP may be transmitted from a Hyper Text Transport Protocol (HTTP) proxy of the at least one proxy server to a HTTP server and a request for data services using RTSP may be transmitted from the at least one proxy server to a RTSP server. The authentication information may be transmitted from the subscriber data server to the at least one proxy server may comprise an integrity key IK and a cipher key CK and the authentication information transmitted from the at least one user equipment to the at least one proxy sever may comprise an integrity key IK and a cipher key CK which keys may be processed by the at least one proxy server to determine if the at least one user is authentic. The authentication information transmitted from the subscriber data server and the at least one user equipment may be generated using the Authentication and Key Agreement (AKA) protocol.

DETAILED DESCRIPTION OF THE INVENTION

Figure 1:
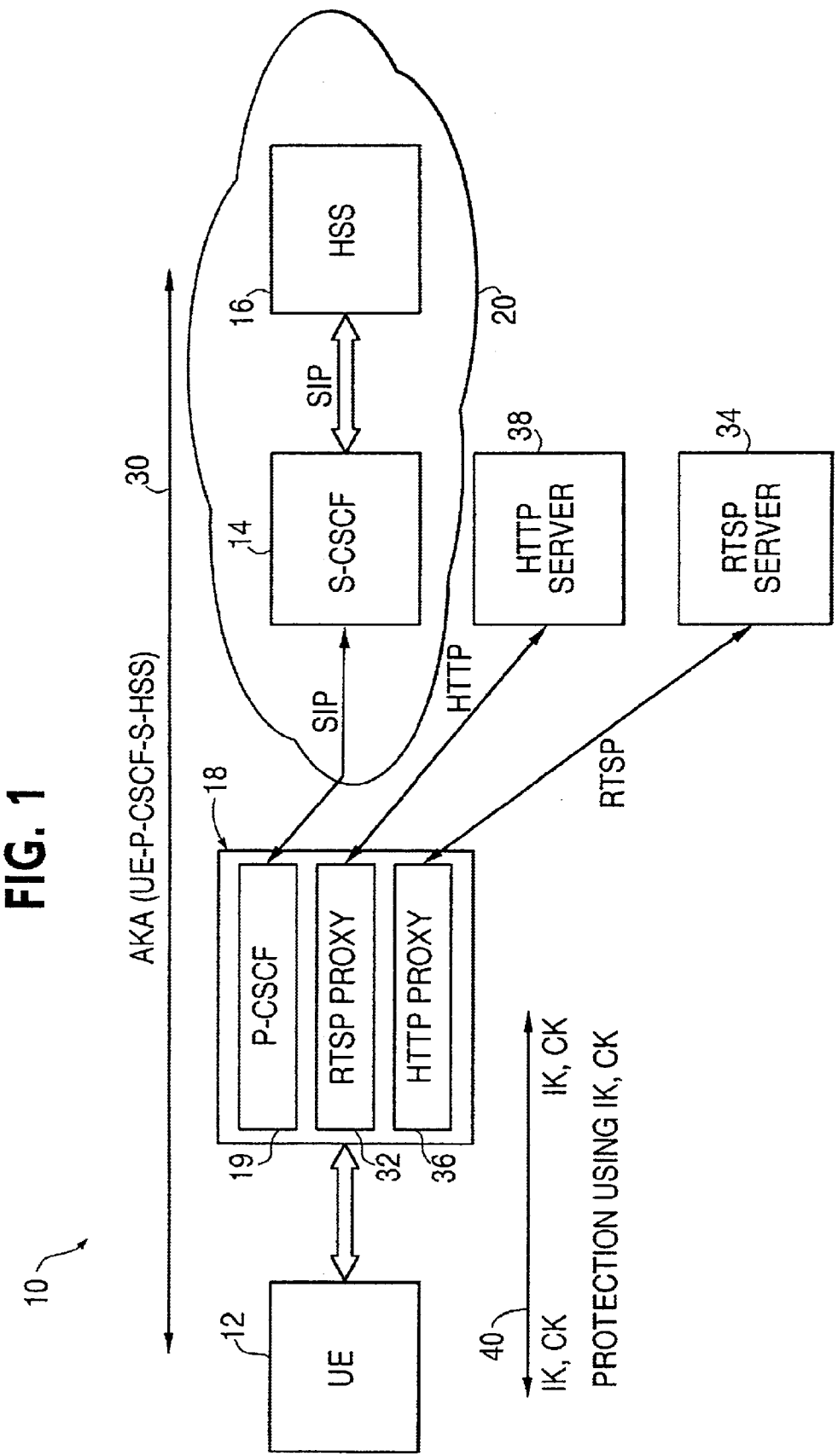
FIG. 1 illustrates a block diagram of a system in accordance with the present invention.

FIG. 1 illustrates a system 10 which includes conventional SIP entities. The entities include at least one UE 12, S-CSCF 14 and HSS 16. At least one proxy server 18 has resident therein the SIP P-CSCF 19, which is contacted by the UE 12, during sessions requesting data services using the SIP protocol. While a single proxy server 18 is illustrated, it should be understood that the invention may be practiced with more than one proxy server 18, including proxies using authentication information transmitted from the subscriber data server to authenticate sessions for multiple protocols. Authentication of the at least one UE 12 for SIP and additional protocols uses the HSS 16 of the home network 20 which stores at least one user profile of the users of the at least one UE regarding providing sessions of data services. It should be understood that use of SIP in the home network 20 as the source of the authentication information for the other protocols is not required in the practice of the invention with the invention being applicable to protocols other than SIP. The at least one user profile stored in the HSS 16 includes authentication information. The same stored authentication information is used to authenticate the at least one UE 12 for a session of data services when a request for data services is made using a first protocol, e.g., without limitation, the SIP protocol and at least one additional protocol.

The at least one UE 12 requests sessions for data services using the first network protocol e.g. SIP and sessions for data services using at least one additional protocol. The at least one UE 12 stores authentication information for the first protocol which is transmitted to the at least one proxy server 18 to authenticate the at least one UE 12 for all of the protocols. The HSS 16, without limitation, may utilize the AKA protocol to provide the authentication information in the form of the IK and CK keys as indicated by arrow 30 from the HSS 16 to the P-CSCF 19 and the UE 12 where the authentication information is stored and from the UE to the P-CSCF as indicated by arrow 40.

The present invention differs from the prior art in that the at least one proxy server 18 includes P-CSCF 19 and HTTP and RTSP proxies 32 and 36 respectively for authenticating the at least one UE 12 to use at least one protocol in addition to the protocol used by the home network, e.g. SIP, e.g. RTSP and HTTP. In a preferred architecture, a single proxy server 18 is used, but the invention is not limited thereto. In a preferred embodiment, the additional proxies are a HTTP proxy 32 and a RTSP proxy 36 all of which are resident in the at least one proxy server 18. The SIP generated authentication information used by the at least one UE 12 for the HTTP proxy 32 and RTSP proxy 36 is the same as that used by the P-CSCF 19.

In accordance with the invention, when the at least one UE 12 requests a session of data services using any protocol other than protocol of the home network 20, the request is authenticated by using the authentication information provided by the home network, e.g. SIP authentication information IK and CK from the HSS 16. It should be understood that the invention is not limited to the use of the IK and CK authentication information. Therefore, if the at least one UE 12 requests a session of data services using a protocol other than the protocol used by the home network 20, the authentication information obtained from a subscriber data server and specifically, the HSS 16 of the SIP protocol is used for at least one other protocol. Requests for data services for the at least one additional protocol, e.g. RTSP and HTTP protocols are authenticated using the authentication information of the home network 20 stored in the subscriber data server of the home network, e.g. HSS 16.

The use of at least one proxy server 18 to provide authentication for at least one UE 12 requesting sessions using multiple protocols by using the authentication information of only one protocol used in the home network 20 saves performing authentication with unique information for each of the protocols as in the prior art. As a result, the prior art requirement of providing distinct authentication information to authenticate each request for a session of data services by the at least one UE 12 for each additional protocol is simplified since authentication of the UE 12 to use the additional protocols requires use of only the authentication information already provided from the HSS 16 of the home network 20 for the first protocol.

A request for a session of data services from the at least one UE 12 is transmitted to the HTTP proxy 32 of the proxy server 18 where the at least one UE12 is authenticated and thereafter is transmitted to HTTP server 38. Similarly, a request for a session of data services from the at least one UE 12 is transmitted to the RTSP proxy 36 of the proxy server 18 where the at least one UE 12 is authenticated and thereafter is transmitted to the RTSP server 34.

While the invention has been described in terms of its preferred embodiments, it should be understood that numerous modifications may be made thereto without departing form the spirit and scope of the present invention. It is intended that all such modifications fall within the scope of the appended claims.

What is claimed is:

1. A system comprising:
   a home network including a subscriber data server which stores at least one user profile regarding providing of data services to at least one user with the profile including authentication information used to authenticate the at least one user of the data services when a request for data services is made using a first protocol;
   at least one user equipment which requests data services using the first network protocol and data services using at least one additional protocol, the at least one user equipment storing authentication information which is used when a request for data services is made to authenticate the at least one user;
   at least one proxy server, including resident therein a first proxy for the first protocol and at least one additional proxy for the at least one additional protocol; and wherein
   the first proxy and the at least one additional proxy of the at least one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server; and
   the authentication information transmitted from the subscriber data server comprises a pair of keys and the authentication information transmitted from the at least one user equipment comprises a pair of keys.

2. A system in accordance with claim 1 wherein;
   the subscriber data server is a home subscriber server (HSS); and
   the first protocol is the Session Initiation Protocol (SIP) and a request for data services using SIP is transmitted from a Proxy Call State Control Function (P-CSCF) of the at least one proxy server to a Serving Call State Control Function (S-CSCF) server of the home network.

3. A system in accordance with claim 2 wherein:
   the authentication information transmitted from the subscriber data server to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

4. A system in accordance with claim 3 wherein:
   the authentication information transmitted from the HSS and the at least one user equipment is generated using the Authentication and Key Agreement (AKA) protocol.

5. A system in accordance with claim 1 wherein:
   the subscriber data server is a home subscriber server (HSS);
   the first protocol is the Session Initiation Protocol (SIP) and a request for data data services using SIP is transmitted from a Proxy Call State Control Function (P-CSCF) of the at least one proxy server to a Serving Call State Control Function (S-CSCF) server of the home network; and
   the at least one additional network protocol is the Hyper Text Transport Protocol (HTTP) and a request for data services using HTTP is transmitted from a Hyper Text Transport Protocol (HTTP) proxy of the at least one proxy server to a HTTP server.

6. A system in accordance with claim 5 wherein:
   the authentication information transmitted from the subscriber data server to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

7. A system in accordance with claim 6 wherein:
   the authentication information transmitted from the HSS and the at least one user equipment is generated using the Authentication and Key Agreement (AKA) protocol.

8. A system in accordance with claim 1 wherein:
   the subscriber data server is a home subscriber server (HSS);
   the first protocol is the Session Initiation Protocol (SIP) and a request for data services using SIP is transmitted from a Proxy Call State Control Function (P-CSCF) of the at least one proxy server to a Serving Call State Control Function (S-CSCF) server; and
   the at least one additional protocol is the Real-Time Streaming Protocol (RTSP) and a request for data services is transmitted from a Hyper Text Transport Protocol (HTTP) proxy of the at least one proxy server to a RTSP server.

9. A system in accordance with claim 8 wherein:
   the authentication information transmitted from the subscriber data server to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

10. A system in accordance with claim 9 wherein:
the authentication information transmitted from the HSS and the at least one user equipment is generated using the Authentication and Key Agreement (AKA) protocol.

11. A system in accordance with claim 1 wherein:
the subscriber data server is a home subscriber server (HSS);
the first protocol is the Session Initiation Protocol (SIP) and a request for data services using SIP is transmitted from a Proxy Call State Control Function (P-CSCF) of the at least one proxy server to a Serving Call State Control Function (S-CSCF) server of the home network; and
the at least one additional protocol is the Hyper Text Transport Protocol (HTTP) and the Real-Time Streaming Protocol (RTSP) and a request for data services using HTTP is transmitted from a Hyper Text Transport Protocol (HTTP) proxy of the at least one proxy server to a HTTP server and a request for data services using RTSP is transmitted from a Real-Time Streaming Protocol (RTSP) proxy of the at least one proxy server to a RTSP server.

12. A system in accordance with claim 11 wherein:
the authentication information transmitted from the subscriber data server to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

13. A system in accordance with claim 12 wherein:
the authentication information transmitted from the HSS and the at least one user equipment is generated using the Authentication and Key Agreement (AKA) protocol.

14. A system in accordance with claim 1 wherein:
the authentication information transmitted from the subscriber data server to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

15. A system in accordance with claim 14 wherein:
the authentication information transmitted from the subscriber data server and the at least one user equipment is generated using the Authentication and Key Agreement (AKA) protocol.

16. In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server including resident therein a first proxy for the first network protocol and at least one additional proxy for the at least one additional protocol, a method of authentication of the at lease one user equipment comprising:
the first proxy and the at least one additional proxy of the at least one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server; and
the authentication information transmitted from the subscriber data server comprises a pair of keys and the authentication information transmitted from the at least one user equipment comprises a pair of keys.

17. A method in accordance with claim 16 wherein:
the subscriber data server is a home subscriber server (HSS); and
the first protocol is the Session Initiation Protocol (SIP) and any request for data services using SIP is transmitted from a Proxy Call State Control Function (P-CSCF) of the at least one proxy server to a Serving Call State Control Function (S-CSCF) server of the home network.

18. A method in accordance with claim 17 wherein:
the authentication information transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

19. A system in accordance with claim 18 wherein:
the authentication information transmitted from the HSS and the at least one user equipment is generated using the Authentication and Key Agreement (AKA) protocol.

20. A method in accordance with claim 16 wherein:
the subscriber data server is a home subscriber server (HSS);
the first protocol is the Session Initiation Protocol (SIP) and a request for data data services using SIP is transmitted from a Proxy Call State Control Function (P-CSCF) of the at least one proxy server to a Serving Call State Control Function (S-CSCF) server of the home network; and
the at least one additional network protocol is the Hyper Text Transport Protocol (HTTP) and a request for data services using HTTP is transmitted from a Hyper Text Transport Protocol (HTTP) proxy of the at least one proxy server to a HTTP server.

21. A method in accordance with claim 20 wherein:
the authentication information used transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

22. A system in accordance with claim 21 wherein:
the authentication information transmitted from the HSS and the at least one user equipment is generated using the Authentication and Key Agreement (AKA) protocol.

23. A method in accordance with claim 16 wherein:
the subscriber data server is a home subscriber server (HSS);
the first protocol is the Session Initiation Protocol (SIP) and a request for data services using SIP is transmitted from a Proxy Call State Control Function (P-CSCF) of the at least one proxy server to a Serving Call State Control Function (S-CSCF) server; and
the at least one additional protocol is the Real-Time Streaming Protocol (RTSP) and a request for data services is transmitted from a Hyper Text Transport Protocol (HTTP) proxy of the at least one proxy server to a RTSP server.

24. A method in accordance with claim 23 wherein:
the authentication information used transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

25. A system in accordance with claim 24 wherein:
the authentication information transmitted from the HSS and the at least one user equipment is generated using the Authentication and Key Agreement (AKA) protocol.

26. A method in accordance with claim 16 wherein:
the subscriber data server is a home subscriber server (HSS);
the first protocol is the Session Initiation Protocol (SIP) and a request for data services using SIP is transmitted from a Proxy Call State Control Function (P-CSCF) of the at least one proxy server to a Serving Call State Control Function (S-CSCF) server of the home network; and
the at least one additional protocol is the Hyper Text Transport Protocol (HTTP) and the Real-Time Streaming Protocol (RTSP) and a request for data services using HTTP is transmitted from a Hyper Text Transport Protocol (HTTP) proxy of the at least one proxy server to a HTTP server and a request for data services using RTSP is transmitted from a Real-Time Streaming Protocol (RTSP) proxy of the at least one proxy server to a RTSP server.

27. A method in accordance with claim 26 wherein:
the authentication information used transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

28. A system in accordance with claim 27 wherein:
the authentication information transmitted from the HSS and the at least one user equipment is generated using the Authentication and Key Agreement (AKA) protocol.

29. A method in accordance with claim 16 wherein:
the authentication information transmitted from the subscriber data server to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

30. A method in accordance with claim 29 wherein:
the authentication information transmitted from the subscriber data server and the at least one user equipment is generated using the Authentication and Key Agreement (AKA) protocol.

31. In a system comprising a home network including
a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server comprising:
a first proxy for the first protocol and at least one additional proxy for the at least one additional protocol which are resident therein; and wherein
the at least one proxy server authenticates requests for data services received from the at least one user equipment for the protocols by using the authentication information of the at least one profile which is transmitted from the subscriber data server to the at least one proxy server and the authentication information of the at least one user transmitted from the at least one user equipment to the at least one proxy server; and
the authentication information transmitted from the subscriber data server comprises a pair of keys and the authentication information transmitted from the at least one user equipment comprises a pair of keys.

32. A proxy server in accordance with claim 31 wherein;
the subscriber data server is a home subscriber server (HSS); and the first protocol is the Session Initiation Protocol (SIP) and any request for data services using SIP is transmitted from a Proxy Call State Control Function (P-CSCF) of the at least one proxy server to a Serving Call State Control Function (S-CSCF) server of the home network.

33. A proxy server in accordance with claim 32 wherein:
the authentication information transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

34. A proxy server in accordance with claim 33 wherein:
the authentication information transmitted from the HSS and the at least one user equipment is generated using the Authentication and Key Agreement (AKA) protocol.

35. A proxy server in accordance with claim 31 wherein:
the subscriber data server is a home subscriber server (HSS); and the first protocol is the Session Initiation Protocol (SIP) and a request for data data services using SIP is transmitted from a Proxy Call State Control Function (P-CSCF) of the at least one proxy server to a Serving Call State Control Function (S-CSCF) server of the home network; and the at least one additional network protocol is the Hyper Text Transport Protocol (HTTP) and a request for data services using HTTP is transmitted from a Hyper Text Transport Protocol (HTTP) proxy of the at least one proxy server to a HTTP server.

36. A proxy server in accordance with claim 35 wherein:
the authentication information used transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

37. A proxy server in accordance with claim 36 wherein:
the authentication information transmitted from the HSS and the at least one user equipment is generated using the Authentication and Key Agreement (AKA) protocol.

38. A proxy server in accordance with claim 31 wherein:
the subscriber data server is a home subscriber server (HSS); and
the first protocol is the Session Initiation Protocol (SIP) and a request for data services using SIP is transmitted from the at least one proxy server to a Serving Call State Control Function (S-CSCF) server, and the at least one additional protocol is the Real-Time Streaming Protocol (RTSP) and a request for data services is transmitted from a Real-Time Streaming Protocol (RTSP) proxy of the at least one proxy server to a RTSP server.

39. A proxy server in accordance with claim 38 wherein:
the authentication information used transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

40. A proxy server in accordance with claim 39 wherein:
the authentication information transmitted from the HSS and the at least one user equipment is generated using the Authentication and Key Agreement (AKA) protocol.

41. A proxy server in accordance with claim 31 wherein:
the subscriber data server is a home subscriber server (HSS); and
the first protocol is the Session Initiation Protocol (SIP) and a request for data services using SIP is transmitted from a Proxy Call State Control Function (P-CSCF) of the at least one proxy server to a Serving Call State Control Function (S-CSCF) server of the home network, and the at least one additional protocol is the Hyper Text Transport Protocol (HTTP) and the Real-Time Streaming Protocol (RTSP) and a request for data services using HTTP is transmitted from a Hyper Text Transport Protocol (HTTP) proxy of the at least one proxy server to a HTTP server and a request for data services using RTSP is transmitted from a Real-Time Streaming Protocol (RTSP proxy of the at least one proxy server to a RTSP server.

42. A proxy server in accordance with claim 41 wherein:
the authentication information used transmitted from the HSS to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

43. A proxy server in accordance with claim 42 wherein:
the authentication information transmitted from the HSS and the at least one user equipment is generated using the Authentication and Key Agreement (AKA) protocol.

44. A proxy server in accordance with claim 31 wherein:
the authentication information transmitted from the subscriber data server to the at least one proxy server comprises an integrity key IK and a cipher key CK and the authentication information transmitted from the at least one user equipment to the at least one proxy sever comprises an integrity key IK and a cipher key CK which keys are processed by the at least one proxy server to determine if the at least one user is authentic.

45. A proxy server in accordance with claim 44 wherein:
the authentication information transmitted from the subscriber data server and the at least one user equipment is generated using the Authentication and Key Agreement (AKA) protocol.

46. A system comprising:
a home network including a subscriber data server which stores at least one user profile regarding providing of data services to at least one user with the profile including authentication information used to authenticate the at least one user of the data services when a request for data services is made using a first protocol;
at least one user equipment which requests data services using the first network protocol and data services using at least one additional protocol, the at least one user equipment storing authentication information which is used when a request for data services is made to authenticate the at least one user;
at least one proxy server, including resident therein a first proxy for the first protocol and at least one additional proxy for the at least one additional protocol; and wherein
the first proxy and the at least one additional proxy of the at least one proxy server authenticates requests for data services received from the at least one user equipment for the protocols by processing the authentication information of the at least one profile which is transmitted from the subscriber data server to the at least one proxy server and the authentication information of the at least one user transmitted from the at least one user equipment to the at least one proxy server to determine if the at least one user is authentic.

47. In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server including resident therein a first proxy for the first network protocol and at least one additional proxy for the at least one additional protocol, a method of authentication of the at lease one user equipment comprising:

the first proxy and the at least one additional proxy of the at least one proxy server authenticates requests for data services received from the at least one user equipment for the protocols by processing the authentication information of the at least one profile which is transmitted from the subscriber data server to the at least one proxy server and the authentication information of the at least one user transmitted from the at least one user equipment to the at least one proxy server to determine if the at least one user is authentic.

48. In a system comprising a home network including a subscriber data server which stores at least one user profile regarding providing of data services to at least one user with the profile including authentication information used to authenticate the at least one user of the data services when a request for data services is made using a first protocol and at least one user equipment which requests data services using the first network protocol and data services using at least one additional protocol, the at least one user equipment storing authentication information which is used when a request for data services is made to authenticate the at least one user, at least one proxy server comprising:

a first proxy for the first protocol and at least one additional proxy for the at least one additional protocol which are resident therein; and wherein the at least one proxy server authenticates requests for data services received from the at least one user equipment for the protocols by processing the authentication information of the at least one profile which is transmitted from the subscriber data server to the at least one proxy server and the authentication information of the at least one user transmitted from the at least one user equipment to the at least one proxy server to determine if the at least one user is authentic.

* * * * *